Nov. 18, 1969     B. L. BRAMES     3,478,713
WARNING DEVICE
Filed Aug. 15, 1967
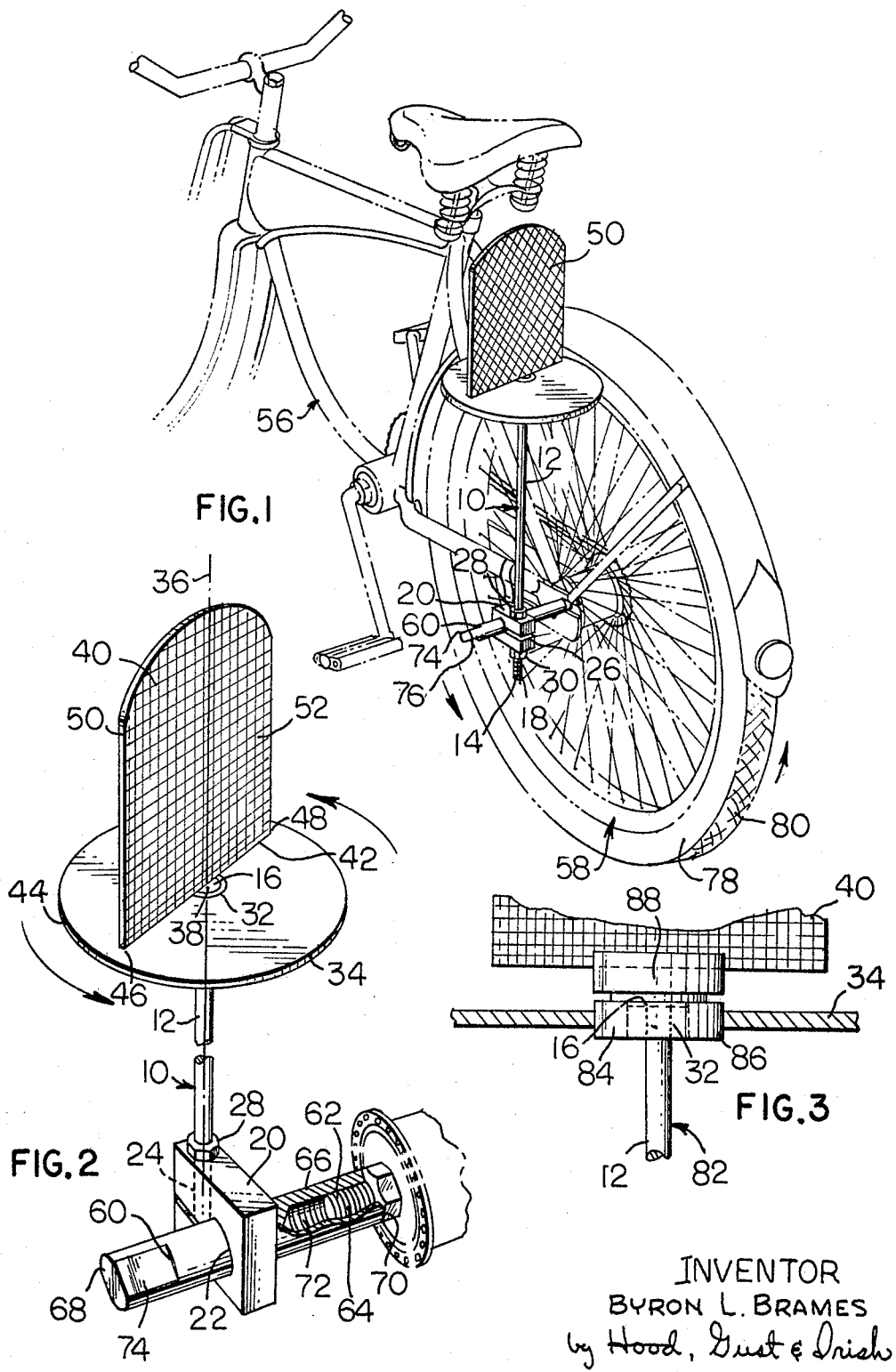
INVENTOR
BYRON L. BRAMES
by Hood, Gust & Irish
ATTORNEYS 3,478,713
WARNING DEVICE
Byron L. Brames, R.R. 1, Monroeville, Ind. 46773
Filed Aug. 15, 1967, Ser. No. 660,801
Int. Cl. B60q 1/26
U.S. Cl. 116—56                                    4 Claims

ABSTRACT OF THE DISCLOSURE

A warning device for a wheeled vehicle comprising a horizontally disposed wheel and a flag upstanding therefrom. The wheel is mounted to the vehicle with its peripheral edge engaging the side wall of a tire of the vehicle whereby when the vehicle moves, the wheel rotates and the flag rotates therewith. The flag has oppositely facing surfaces one of which is a light-reflecting surface; the other of which is coated so to have an appearance different from the light-reflecting surface. When the flag is rotated, the flag has an appearance of a flasher. In one embodiment a gear mechanism is used to connect the flag to the wheel for rotating the flag a partial revolution for each full revolution of the wheel whereby the device can be adapted for use with both high speed and low speed vehicles.

BACKGROUND OF THE INVENTION

Field of the invention

This invention relates generally to a warning device, and more specifically to a warning device for a wheeled vehicle, for example, a bicycle, a farm tractor, a truck, an automobile or the like.

Description of the prior art

Heretofore many warning devices have been proposed for vehicles. These devices have been of many types and designs. Flashing lights, lights of various colors, reflectors, flags, and moving brightly colored devices have all been proposed. However, each of these devices are not especially useful with certain types of vehicles both due to the structure of the vehicle and the device and the expense of manufacturing the device.

SUMMARY OF THE INVENTION

In the broader aspects of this invention, a warning device is provided comprising a wheel and means for mounting the wheel to a vehicle. The wheel is rotatable about an axis of rotation with respect to the mounting means and has a flag of self-supporting material extending axially outwardly of the wheel. The flag is connected to the wheel whereby the flag rotates when the wheel rotates. The flag has oppositely facing surfaces one of which is a light-reflecting surface.

It is the primary object of this invention to provide a warning device for a wheeled vehicle.

Another object of this invention is to provide a warning device for a vehicle which is relatively inexpensively manufactured and has the appearance of a flashing light.

A further object of this invention is to provide an improved warning device which can be relatively inexpensively manufactured and used on both slow and fast traveling vehicles.

Still further an object of this invention is to provide an improved warning device which warns more effectively than a simple reflector or light and is less expensively manufactured and more versatile to use than a flashing light.

BRIEF DESCRIPTION OF THE DRAWINGS

FIG. 1 is a fragmentary perspective view of one embodiment of the device of this invention mounted on a bicycle in operating position;

FIG. 2 is an enlarged fragmentary and broken-away view of the device shown in FIG. 1 illustrating the means by which the device is mounted to the rear axle of the bicycle;

FIG. 3 is a fragmentary side view of a second embodiment of the device of this invention.

DESCRIPTION OF THE PREFERRED EMBODIMENT

Referring to the drawings, there is shown the warning device 10 of this invention. Device 10 comprises a rod 12 having opposite ends 14, 16. Rod 12 has a threaded portion 18 adjacent to end 14. This threaded portion 18 is connected to a clamp 20. Clamp 20 has a bore 22 therein extending in one direction and a bore 24 therein extending perpendicularly thereto. Bores 22, 24 are spaced apart. A slot 26 extends from one peripheral boundary of the clamp 20 and connects with bore 22 from a diametral direction. Bore 24 communicates with the slot 26 generally perpendicularly thereto. Threaded portion 18 of rod 10 is positioned in bore 24 and nuts 28, 30 are positioned on portion 18 on opposite sides of the clamp 20 to forcefully close the slot 26 as desired.

Coaxially secured to end 16 of the rod 10 is a suitable bearing 32. Coaxially secured to bearing 32 is a disc-shaped wheel 34 having a peripheral edge 44. Wheel 34 is generally perpendicular to the axis 36 of the rod 10 and axis 36 passes through the center 38 of the wheel 34 and the bearing 32. Bearing 32 and wheel 34 can also be described as being concentric.

Secured to the wheel 34 is a flag 40. Flag 40 is made of self-supporting sheet material and is secured to the wheel 34 with an edge 42 thereof positioned over center 38 and extending diametrically of wheel 34. Flag 40 extends on opposite sides of the center 38 an equal distance; and thus, the axis 36 extends through the center of the flag 40. The flag 40 does not extend to the peripheral edge 44 of the wheel, but in contrast, terminates at positions 46, 48 which are spaced apart from opposite portions of the peripheral edge 44 of the wheel 34. Since the wheel 34 protrudes further than the flag, the wheel 34 serves to protect the flag 40 from damage.

Flag 40 has two oppositely facing surfaces 50, 52. Surface 50 is a light-reflecting surface. In a specific embodiment surface 50 can be covered with reflectorized tape such as that sold by Minnesota Mining and Manufacturing Company under their "Scotch-lite" trademark and is a medium dark red in color. Surface 52 on the other hand is coated with a surface coating having an appearance different from the light-reflecting surface 50. In a specific embodiment surface 52 is painted a bright orange-red color.

In operation, the device 10 can be mounted to a bicycle 56 adjacent to the rear wheel assembly 58 thereof (see FIG. 1). The device 10 is mounted to a bicycle 56 by securing the axle extender 60 to the bicycle axle 62 and securing the extender 60 within the bore 22 of the clamp 20 in a manner to position the rod 12 in a generally vertical position.

Specifically, bicycles 56 are conventionally provided with axle 62 having a threaded portion 64 adjacent their distal ends. Axle extender 60 comprises a rod 66 with opposite ends 68, 70. Rod 66 has a coaxial bore 72 extending thereinto from end 70. Bore 72 is threaded. Axle extender 60 is secured coaxially of the axle 62 by positioning the portion 64 within the bore 72. End 68 is provided with oppositely facing flattened surfaces 74, 76. Flattened surfaces 74, 76 provide means by which a wrench can be connected to the rod 66 adjacent end 68 and the axle extender 60 can be threaded onto the axle 62 as above-described and secured to the bicycle 56. In this position, the axle extender 60 extends axially outwardly of the wheel assembly 58 of the bicycle 56.

As above-mentioned axle extender 60 is positioned within bore 22 of clamp 20. The device 10 of this invention is slid axially of the extender 60 toward the bicycle 56 until the peripheral edge 44 of the wheel 34 engages the side wall 78 of the tire 80 of the wheel assembly 58 of the bicycle 56. With the peripheral edge 44 engaging the side wall 78 and the rod 12 extending generally in a vertical direction, the clamp 20 is forcefully urged to close the slot 26 by adjusting the nuts 28, 30.

When the wheel assembly 58 of the bicycle 56 moves, the motion of the tire 80 is imparted to the wheel 34 and the flag 40 is rotated about the axis 36. Since the surfaces 50, 52 of the flag appear differently, both in daylight and at night when a beam of light strikes the flag 40, the flag 40 has the appearance of a flashing light as it is rotated. Thus, the flag 40 simulates a flashing light and is more obvious than the simple reflector or light. Thus, the flag 40 comprises a highly effective warning device.

Referring now to FIG. 3, a second embodiment 82 of the device of this invention is illustrated. Embodiment 82 is identical to the embodiment 10 illustrated in FIGS. 1 and 2 and hereinabove described except that a gear reduction mechanism 84 is placed between the wheel 34 and the flag 40 and a different means (not shown) for connecting the rod 12 to a vehicle. Embodiment 82 is especially adapted for vehicles traveling at substantially higher speeds than bicycle 56, for example, tractors, trucks, automobiles and the like. The device 82 can be mounted to such vehicles by any bracket, clamp or the like, or by clamp 20 if clamp 20 is suitable.

Gear reduction mechanism 84 comprises two portions 86 and 88. Portion 86 is annular in shape and secured to the wheel 34 coaxially thereof. Bearing 32 is secured within the portion 86 coaxially of both the mechanism 84 and the wheel 34; and the rod 12 is secured to the bearing 32 as in the first embodiment 10 of this invention. Portion 88 is connected to portion 86 by suitable gears (not shown). Flag 40 is secured to the portion 88.

In operation, embodiment 82 operates substantially the same as embodiment 10 afore-described. However, for every full revolution of rotation of wheel 34, flag 40 rotates only a partial revolution. This is accomplished by the gearing mechanism above-mentioned which is disposed between portions 86, 88 of the gear reduction mechanism 84.

Thus it can be recognized that the improved warning device of this invention provides a device which simulates a flashing light. The warning device of this invention can be used both on relatively slow moving vehicles such as a bicycle and relatively fast moving vehicles such as trucks and automobiles. Further, the improved warning device of this invention is relatively inexpensive to manufacture and capable of many uses. To adapt the device to each specific use it is within the scope of this invention to vary the pertinent dimensions of the device. For example, the diameter of the wheel 34, the dimensions of the flag 40 and the length of the rod 12 may vary all within the scope of this invention.

In a specific construction of the device 10 for use with a bicycle 56 the following dimensions apply:

|  | Inches |
| --- | --- |
| Diameter of wheel 34 | 7⅝ |
| Flag 40 measured in the diametral direction of wheel 34 | 6 |
| Rod 12 measured axially thereof | 12 |
| Flag 40 measured axially thereof | 7⅝ |

It is within the understanding and the scope of this invention that the diameter of the wheel 34 can be reduced to increase the speed at which the wheel 34 will rotate and increased to decrease the speed at which the wheel 34 will rotate. Thus, the diameter of the wheel 34 must be chosen especially for each specific use of the improved warning device of this invention. When using embodiment 82, the gear reduction mechanism 84 and the diameter of the wheel 34 must be chosen for each specific use of the device of this invention.

While there have been described above the principles of this invention in connection with specific apparatus, it is to be clearly understood that this description is made only by way of example and not as a limitation to the scope of the invention.

What is claimed is:

1. A warning device for a wheeled vehicle comprising a disc having a peripheral edge, means for mounting said disc to a wheeled vehicle with said peripheral edge engaged to a wheel of said vehicle, said disc being mounted for rotation on said mounting means, and a flag of self-supporting material connected to said disc and extending axially outwardly of said disc whereby said flag and disc rotate about the same axis of rotation whenever said disc rotates, said flag having oppositely facing surfaces, one of said surfaces being a light-reflecting surface.

2. The device of claim 1 wherein said other flag surface has a surface coating having an appearance different from said one flag surface whereby said flag has the appearance of a flasher upon rotation.

3. The device of claim 2 wherein said flag material is sheet material, said flag being generally perpendicular of said disc, said axis extending through the centers of said disc and flag, and wherein the diametral dimension of said disc is larger than the corresponding dimension of said flag in the same direction.

4. The device of claim 2 further comprising a bicycle having a wheel assembly and an axle, said axle having an axis, said wheel assembly having a tire with a side wall, and wherein said mounting means includes an axle extender and a mounting element, said axle extender being secured to said axle and extending axially outwardly of said bicycle, said element being connected to said axle extender, bearing means connected to said element, said disc being connected to said bearing means, whereby the peripheral edge of said disc is engaged to the side wall of said tire and said tire upon rotation imparts rotation to said disc and flag.

References Cited
UNITED STATES PATENTS 2,741,948   4/1956   Parker _____ 116—56 XR

FOREIGN PATENTS 414,096   7/1934   Great Britain.
1,203,449   7/1959   France.
327,961   3/1958   Switzerland.

LOUIS J. CAPOZI, Primary Examiner